United States Patent [19]

Blanken

[11] 4,364,780

[45] Dec. 21, 1982

[54] METHOD OF PROVIDING A METAL COMPONENT WITH A THERMALLY BLACK SURFACE

[75] Inventor: Jacob Blanken, Eindhoven, Netherlands

[73] Assignee: U.S. Philips Corporation, New York, N.Y.

[21] Appl. No.: 253,486

[22] Filed: Apr. 13, 1981

[30] Foreign Application Priority Data

May 9, 1980 [NL] Netherlands ........................ 8002665

[51] Int. Cl.³ ........................ C23C 17/00; B32B 15/20; B32B 15/18; B32B 15/04

[52] U.S. Cl. ........................................ 148/6; 148/6.27; 148/6.3; 148/6.31; 148/6.35; 148/31.5

[58] Field of Search .................. 148/6, 6.27, 6.3, 6.31, 148/6.35, 31.5

[56] References Cited

FOREIGN PATENT DOCUMENTS 868026 of 1953 Fed. Rep. of Germany .

*Primary Examiner*—James R. Hoffman

*Attorney, Agent, or Firm*—Marc D. Schechter

[57] ABSTRACT

The surface of a metal from the group of molybdenum, nickel, iron, tungsten and copper, or an alloy comprising at least one metal from this group, is made thermally black (black for thermal radiation) and very resistant to high temperatures. This is achieved by coating the metal or alloy with a layer of aluminum which is from one to a few μm thick. The metal or the alloy thus coated is then heated in a nonreactive atmosphere until the aluminum has reacted with the metal or a metal from the alloy. Finally, the coated metal or alloy is fired in wet hydrogen so that the aluminum is partially oxidized from the compound of the aluminum with the metal or the alloy. In this manner a thermally black surface which can withstand very high temperatures is obtained.

12 Claims, 1 Drawing Figure

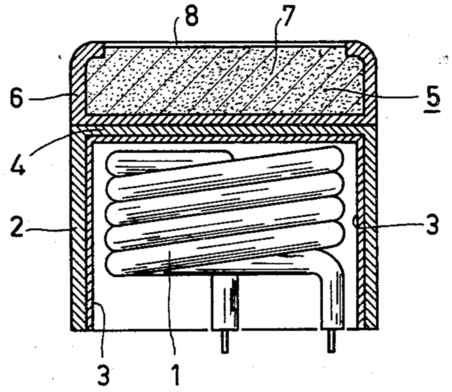
8
7
6
5
4
2
3
3
1

METHOD OF PROVIDING A METAL COMPONENT WITH A THERMALLY BLACK SURFACE

BACKGROUND OF THE INVENTION

The invention relates to a method of providing a metal component with a thermally black surface. According to the method, a layer of one or more metal alloys are provided on the metal component. The layer has a thickness of one to a few μm. The layer of metal or metal alloy forms at least one metal compound with a material of the component or with each other. The metal compound is obtained by heating the coated metal component in a substantially nonreactive atmosphere.

The invention also relates to a method of providing a deep-drawn cathode shaft having a thermally black surface at least on the inside of the shaft.

It is generally known that the capacity of metals to absorb and radiate thermal energy can be augmented by providing them with a thermally black surface. For example the so-called shadow mask in a color display tube is blackened so as to increase the heat-radiating capacity. It is also known in cathode shafts to thermally blacken the inner surface and/or the outer surface so as to obtain an indirectly heated cathode having a short warm-up time.

German Pat. No. 868,026 describes a method of providing metals with a thermally black surface. In this patent, a thin, for example approximately 10 μm thickness, layer of aluminum or an aluminum alloy is provided on molybdenum. By heating the coated molybdenum in a nonreactive atmosphere, a rough surface layer is formed of a metal compound consisting of aluminum and molybdenum. The disadvantage of such a thermally black layer (consisting, for example, of $Al_3Mo$) is that the aluminum evaporates from the compound at higher temperatures. As a result, the thermally black layer becomes less black over time. Moreover, when such black surface coatings are used in electron tubes, display tubes, and camera tubes, the evaporated aluminum forms a metal mirror elsewhere in the tube, which is not desired.

SUMMARY OF THE INVENTION

It is therefore an object of the invention to provide a method of providing metal components with a thermally black surface which can withstand high temperatures and a high thermal load.

Another object of the invention is to provide a method of providing deep-drawn cathode shafts having a thermally black surface at least on the inside.

According to the invention, the surface of the metal component consists essentially of a metal from the group of molybdenum, nickel, iron, tungsten, and copper, or of an alloy containing at least one metal from this group. The layer, which is from one to a few μm thick, consists entirely of aluminum or of aluminum and one of the metals from the group mentioned above. An aluminum compound is formed by heating the coated metal component in a substantially nonreactive atmosphere. The aluminum compound is then partially oxidized by a firing treatment at 950° C. to 1,200° C. in a wet hydrogen atmosphere so that substantially all the aluminum from the compound is converted into aluminum oxide and a resistent, thermally black layer is obtained.

The layer provided by the method described above may consist exclusively of aluminum. However, it is alternatively possible to provide a layer consisting of, for example, aluminum and molybdenum, preferably in a molecular ratio of $Al_3Mo$ so that the aluminum compound forms more easily. The aluminum and any other metals can be provided on the component surface by means of electrolysis, cataphoresis vapor-deposition or sputtering, or by providing a layer of a suspension of aluminum powder mixed, if desired, with a powder of another metal from the above-described group.

In indirectly heated cathodes, a filament is present in a cathode shaft to which or in which an emissive member is fixed. By making the inner surface of the cathode shaft thermally black, the shaft absorbs thermal energy from the filament quickly and effectively. If the outside of the cathode shaft is also provided with a thermally black surface much thermal energy will be radiated at high temperatures so that a comparatively large amount of heat is required to maintain the cathode at emission temperature. However, this large heat input ensures that the cathode will have a short warm-up time.

In the past, it has proven difficult to provide deep-drawn cathode shafts having a very smooth, inner thermally black layer which can also withstand high temperatures (for example, 1,000° C.).

According to the invention it is possible to manufacture deep-drawn cathode shafts which are coated, on at least the inside, with a thermally black layer which is a few μm thick. The layer contains $Al_2O_3$ and can withstand high temperatures. By means of the method, a plate is used which has at least one surface consisting essentially of a metal from the above-mentioned group of metals or an alloy which contains at least one metal from the group. The metal or alloy is coated with a thin layer of aluminum, or a layer of aluminum and at least one metal from the group. Cathode shafts are then manufactured from the plate thus coated by means of a deep-drawing process. Afterwards, the cathode shafts are fired in wet hydrogen.

By performing the deep-drawing process prior to firing in wet hydrogen and after the formation of the compound, a very smooth thermally black layer, without cracks and damage, is obtained. The layer thickness of the aluminum layer may not be more than 4 to 5 μm, since the material of the plate can no longer be deep-drawn when the black layer becomes too thick. The minimum layer thickness must be 1 μm so as to be able to obtain a complete black layer.

The metal component consists, at least at its surface, essentially of a metal or an alloy of metals from the above-mentioned group of metals. The component may be, for example, a nickel-coated iron cathode shaft or other stratified material, or an alloy, for example, a nickel-iron alloy, a copper-nickel alloy or an iron-nickel-cobalt alloy.

BRIEF DESCRIPTION OF THE DRAWING

The drawing FIGURE is a side view, partly cutaway and partly in cross-section, of a cathode and cathode shaft according to the invention.

DESCRIPTION OF THE PREFERRED EMBODIMENTS

EXAMPLE 1

One side of a 100 μm thick molybdenum plate is provided, by vapor deposition, with a 2 μm thick layer of aluminum. The plate thus coated is then heated to 800° C. in an oxygen-free atmosphere, for example in a vacuum or in a protecting gas such as dry hydrogen. The aluminum layer reacts with the molybdenum, so that a black layer containing $Al_3Mo$ is formed.

The coated plate is then used as a starting material for the manufacture of a deep-drawn cathode shaft, the thermally black surface being on the inside of the shaft. The cathode shaft thus manufactured is then fired in wet hydrogen at 1,000° C. (dew-point from 0° C. to possibly 20° C.). The minimum required temperature is 950° C. As a result of this firing process, the aluminum from the aluminum-molybdenum compound is converted into aluminum oxide, so that inside the cathode shaft a thermally black smooth, aluminum oxide-containing surface is obtained which can withstand high temperatures.

EXAMPLE 2

An iron shadow mask is dipped in a suspension containing very small particles of aluminum in butyl acetate. An approximately 2 μm thick aluminum layer is deposited on the shadow mask. After drying, the coated mask is heated to 750° C. in an oxygen-free atmosphere. The aluminum layer reacts with the iron and forms a thermally black layer. The shadow mask is then fired in wet hydrogen at 1,110° C. so that the aluminum is oxidized from the aluminum-iron compound, and a resistant, thermally black surface is obtained.

EXAMPLE 3

A copper cooling plate is provided with a 5 μm thick layer consisting of aluminum and copper. The inner is provided by means of a sputtering process. The coated cooling plate is then heated to approximately 800° C. in a nonreactive atmosphere. Lastly, the cooling plate is fired in wet hydrogen at 1,000° C. The cooling plate thus treated has no black appearance but is more or less yellow. This yellow surface coating which contains aluminum oxide is, however, thermally black (black for thermal radiation).

EXAMPLE 4

An approximately 2 μm thick layer of aluminum is provided of an iron shadow mask which was previously provided with a layer of nickel. The aluminum is provided by means of vapor-deposition. The mask thus treated is then heated in a vacuum to approximately 800° C. The aluminum layer reacts with the nickel and forms a thermally black layer. The shadow mask is then fired in wet hydrogen at approximately 1,100° C., the aluminum being oxidized from the aluminum-iron compound to obtain a thermally black surface which can withstand high temperatures.

EXAMPLE 5

A grid, wound from wire for an electron tube, consisting of an iron-nickel alloy FeNi(50/50) is provided, by vapor-deposition, with a 2 μm thick layer of aluminum. The coated grid is then heated in a vacuum up to approximately 800° C. The grid is then fired in wet hydrogen at approximately 1,000° C., the grid obtaining the thermally black, very resistant surface.

The Figure shows a cathode having a cathode shaft 2 and a thermally black surface 3 on the inside of the cathode shaft. A filament 1 is provided in the deep-drawn molybdenum cathode shaft 2. The cathode shaft has a wall thickness of, for example, 0.05 mm.

By means of the method according to the invention, the inside of the cathode shaft 2 is coated with a thermally black $Al_2O_3$-containing layer 3 of approximately 3 μm thickness. As a result, the thermal energy radiated by the filament can be absorbed rapidly and effectively. An emissive member 5 comprises a holder 6 and a tungsten member 7. Member 7 is impregnated with an emissive material and is secured in holder 6. Emissive member 7 is secured to the end face 4 of the cathode shaft 2. The surface 8 forms the emissive surface of the cathode.

EXAMPLE 6

In the method described in Example 1, the plate, before being heated to 800° C. in an oxygen-free atmosphere, is first fired at 650° C. for 10 minutes. As a result of this, the $Al_3Mo$ forms more uniformly.

I claim:

1. A method of providing a thermally black surface on a substrate comprising the steps of:

forming a layer of a metal compound on said substrate, said metal compound comprising aluminum and at least one of molybdenum, nickel, iron, tungsten and copper; and oxidizing part of the aluminum from said metal compound.

2. A method as claimed in claim 1, characterized in that the step of oxidizing comprises oxidizing substantially all of the aluminum from the metal compound.

3. A method as claimed in claim 2, characterized in that the step of forming the layer of metal compound comprises:

coating the substrate surface with a layer comprising aluminum and at least one of molybdenum, nickel, iron, tungsten and copper; and heating the coated substrate in a nonreactive atmosphere to produce a compound of aluminum with at least one of molybdenum, nickel, iron, tungsten, and copper.

4. A method as claimed in claim 3, characterized in that the coating consists essentially of aluminum and at least one of molybdenum, nickel, iron, tungsten, and copper.

5. A method as claimed in claim 2, characterized in that the step of forming the layer of metal compound comprises:

providing a substrate having a surface comprising at least one of molybdenum, nickel, iron, tungsten, and copper;

coating the substrate surface with a layer of aluminum; and heating the coated substrate in a nonreactive atmosphere to produce a compound of aluminum with at least one of molybdenum, nickel, iron, tungsten, and copper.

6. A method as claimed in claim 5, characterized in that the substrate surface consists essentially of at least one of molybdenum, nickel, iron, tungsten, and copper.

7. A method as claimed in claim 4 or 6, characterized in that the step of oxidizing is performed by firing the coated substrate at 950° C. to 1200° C. in a wet hydrogen atmosphere, and the layer is from one to a few microns thick.

8. A method of making a deep-drawn cathode shaft having an inside surface which is thermally black, said method comprising the steps of:

providing a planar substrate; and providing a thermally black surface on the substrate by the method of claim 7;

characterized in that prior to the step of oxidizing, the substrate is deep-drawn.

9. A thermally black material capable of withstanding temperatures of at least 1000° C. comprising a metal compound of aluminum and at least one of molybdenum, nickel, iron, tungsten, and copper, characterized in that the material further comprises aluminum oxide.

10. A substrate comprising a surface with a thermally black layer, said layer comprising aluminum oxide and at least one of molybdenum, nickel, iron, tungsten, and copper, said thermally black layer produced by the steps of:

forming a layer of a metal compound on said substrate, said metal compound consisting essentially of aluminum and at least one of molybdenum, nickel, iron, tungsten and copper; and oxidizing part of the aluminum from said metal compound.

11. A substrate as claimed in claim 10, characterized in that:

the substrate surface consists essentially of at least one of molybdenum, nickel, iron, tungsten and copper;

the layer of metal compound is formed on the substrate surface by coating the substrate surface with a layer of aluminum, and heating the coated substrate in a nonreactive atmosphere to produce a compound of aluminum with at least one of molybdenum, nickel, iron, tungsten, and copper;

the step of oxidizing comprises oxidizing substantially all of the aluminum from the metal compound by firing the coated substrate at 950° C. to 1200° C. in a wet hydrogen atmosphere; and the layer is from one to a few microns thick.

12. A cathode comprising a metal cathode shaft having an inner surface with a thermally black layer, said cathode shaft comprising a substrate as claimed in claim 11, characterized in that prior to the step of oxidizing, the substrate is deep-drawn.

* * * * *